United States Patent
Cousin et al.

(10) Patent No.: US 6,474,596 B1
(45) Date of Patent: Nov. 5, 2002

(54) SUSPENSION SYSTEM WITH INTRINSIC SAFETY FEATURES FOR AIRCRAFT POWERPLANTS

(75) Inventors: Antoine Emmanuel Cousin, Paris; Georges Mazeaud, Yerres; Jean-Louis Picard, Vaux le Penil, all of (FR)

(73) Assignee: SNECMA Moteurs, Paris (FR)

(*) Notice: Subject to any disclaimer, the term of this patent is extended or adjusted under 35 U.S.C. 154(b) by 92 days.

(21) Appl. No.: 09/678,259

(22) Filed: Oct. 3, 2000

(30) Foreign Application Priority Data

Oct. 7, 1999 (FR) .............................. 99 12475

(51) Int. Cl.[7] .............................................. B64D 27/00
(52) U.S. Cl. .............................. 244/54; 244/55; 244/56; 244/131
(58) Field of Search .............................. 244/54, 55, 119, 244/127, 131

(56) References Cited

U.S. PATENT DOCUMENTS

| | | | | | |
|---|---|---|---|---|---|
| 3,089,340 A | * | 5/1963 | Dolgy et al. | ................. | 116/293 |
| 4,079,981 A | * | 3/1978 | Mahler et al. | ................. | 244/54 |
| 4,346,861 A | * | 8/1982 | Legrand et al. | ................. | 244/54 |
| 4,520,974 A | * | 6/1985 | Debeneix | ................. | 244/54 |
| 4,603,822 A | * | 8/1986 | Chee | ................. | 244/54 |
| 4,742,975 A | * | 5/1988 | Pachomoff et al. | ................. | 244/54 |
| 4,854,525 A | * | 8/1989 | Chee | ................. | 244/54 |
| 4,943,013 A | * | 7/1990 | Kapala et al. | ................. | 244/54 |
| 5,127,606 A | * | 7/1992 | Chan et al. | ................. | 244/54 |
| 5,238,206 A | * | 8/1993 | Pachomoff | ................. | 244/54 |
| 5,275,357 A | * | 1/1994 | Seelen et al. | ................. | 244/54 |
| 5,303,880 A | * | 4/1994 | Cencula et al. | ................. | 244/54 |
| 5,320,307 A | * | 6/1994 | Spofford et al. | ................. | 244/54 |
| 5,351,930 A | * | 10/1994 | Gwinn et al. | ................. | 244/54 |
| 5,427,348 A | * | 6/1995 | Bacon et al. | ................. | 244/54 |
| 5,620,154 A | * | 4/1997 | Hey | ................. | 244/54 |
| 5,649,417 A | * | 7/1997 | Hey | ................. | 244/54 |
| 5,725,181 A | * | 3/1998 | Hey | ................. | 244/54 |
| 5,860,623 A | * | 1/1999 | Dunstan et al. | ................. | 244/54 |
| 5,871,177 A | * | 2/1999 | Demouzon et al. | ................. | 244/54 |
| 5,921,500 A | * | 7/1999 | Ellis et al. | ................. | 244/54 |
| 5,927,644 A | * | 7/1999 | Ellis et al. | ................. | 244/54 |
| 6,059,227 A | * | 5/2000 | Le Blaye et al. | ................. | 244/54 |
| 6,173,919 B1 | * | 1/2001 | Le Blaye | ................. | 244/54 |
| 6,189,830 B1 | * | 2/2001 | Schnelz et al. | ................. | 244/54 |
| 6,209,822 B1 | * | 4/2001 | Le Blaye | ................. | 244/54 |
| 6,330,995 B1 | * | 12/2001 | Mangeiga et al. | ................. | 244/54 |
| 6,341,746 B1 | * | 1/2002 | Pascal et al. | ................. | 244/54 |

FOREIGN PATENT DOCUMENTS

| | | |
|---|---|---|
| EP | 0 432 800 A1 | 12/1991 |
| EP | 0 741 074 A1 | 11/1996 |
| FR | 2326327 | 4/1977 |
| FR | 2755943 | 5/1998 |

* cited by examiner

Primary Examiner—Charles T. Jordan
Assistant Examiner—Stephen A Holzen
(74) Attorney, Agent, or Firm—Bacon & Thomas, PLLC

(57) ABSTRACT

A suspension system for an aircraft powerplant attached to an aircraft frame and having a housing. The suspension system includes a spindle mounted in a spindle support rigidly joined to the aircraft frame, a bearing cage affixed to the housing and having a bearing positioned therein, a pair of suspension arms connected to the spindle support, and a pair of lateral linkrods configured to link the housing and the suspension arms. The side surfaces of the bearing cage and the suspension arms define a clearance therebetween concentric to the Y-axis. The bearing cage is configurable along the spindle such that the bearing cage is limited to displacement relative to the longitude of the spindle while maintaining contact with the spindle.

4 Claims, 7 Drawing Sheets

SUSPENSION SYSTEM WITH INTRINSIC SAFETY FEATURES FOR AIRCRAFT POWERPLANTS

BACKGROUND OF THE INVENTION

1. Field of the Invention

The invention relates to a suspension system attaching a powerplant to an aircraft frame, whether laterally to the fuselage or suspended from the wing.

2. Related Art

More specifically the present invention relates to a suspension system wherein a bearing is mounted on a bearing cage affixed to a powerplant housing. The bearing is slidable on a spindle that has an axis that is perpendicular to the powerplant axis and is mounted on a spindle support solidly joined to the airframe. Two lateral linkrods each link the housing and one of two suspension arms supported by the spindle support.

Loads along the longitudinal axis are absorbed by the spindle. When the powerplant is mounted laterally to the fuselage, the spindle also absorbs vertical loads along the vertical or Z-axis, whereas the linkrods absorb the lateral loads along the Y-axis. If the powerplant is suspended underneath the wing, the spindle also absorbs the lateral loads along the Y-axis, whereas the vertical loads are absorbed by the linkrods. In both assembly modes, the torque due to engine rotation is absorbed by the bearing and the linkrods.

When the powerplant operates under certain flight conditions, in particular at takeoff, the spindle and the linkrods are subjected to considerable loads. To prevent the powerplant from becoming disengaged, engine aircraft manufacturers must either oversize the suspension components or reinforce certain elements in order to create a double load absorption path. Further, engine aircraft manufacturers must also include additional standby linkrods that will become active in case the spindle or a linkrod breaks. All these solutions entail a substantial increase in weight, and in some instances, an increase in the number of parts.

SUMMARY OF THE INVENTION

The objective of the present invention is to create a suspension system for a powerplant mounted on an aircraft frame which is fitted with safety features that are integrated in the region of the bearing, without increasing weight or adding substantially more parts.

Another objective of the invention is to create an engine suspension system that easily integrates safety features and which requires only minor modification of the suspension's components.

Such objectives are met by the present invention using a suspension system comprising a spindle that is inserted into a cylindrical, slidable bearing that is concentric to the spindle and slidably arranged within a recess formed by two suspension arms and a spindle support that are attached to the aircraft frame. The bearing is supported by a bearing cage that is connected to the powerplant housing, and the two suspension arms are connected to the powerplant housing by two lateral linkrods. The spindle support is concentric with the spindle's axis to limit the travel of the bearing cage in a plane perpendicular to the spindle axis in the event a spindle breaks.

Advantageously, the spindle is arranged so as to prevent the bearing from leaving contact in the event of a linkrod fracture. In one embodiment, the spindle comprises a radial shoulder located at one end that is substantially perpendicular to the spindle axis and spaced apart from a portion of the bearing cage during suspension. In the case of a linkrod fracture, the spindle supports the bearing cage by the shoulder coming into contact with a portion of the bearing cage.

In a second embodiment of the invention, the bearing cage is connected to the housing by means of screws that have axes that run parallel to the spindle axis. The screws are fitted with shank segments that pass through orifices in a small collar formed on the spindle support. The heads of the screws are located by a distance J2 from the outside of the flange and have a diameter larger than that of the orifices. The screw head constitutes the first stop, whereas the flange constitutes the second stop.

BRIEF DESCRIPTION OF THE DRAWINGS

Other advantages and features of the invention are elucidated in the illustrative description of the two preferred embodiments of the invention with reference to the attached drawings, in which:

FIG. 3a is a cross-sectional view in a median plane perpendicular to the X-axis of the powerplant of the front suspension system showing a first embodiment of the invention, FIG. 3b is a view in a direction parallel to the spindle axis of the front suspension system of FIG. 3a;

FIG. 6 is a partial, cross-sectional view through the spindle axis of the median zone of the front suspension system of FIG. 3a.

BRIEF DESCRIPTION OF THE PREFERRED EMBODIMENTS OF THE INVENTION

Figure 1:
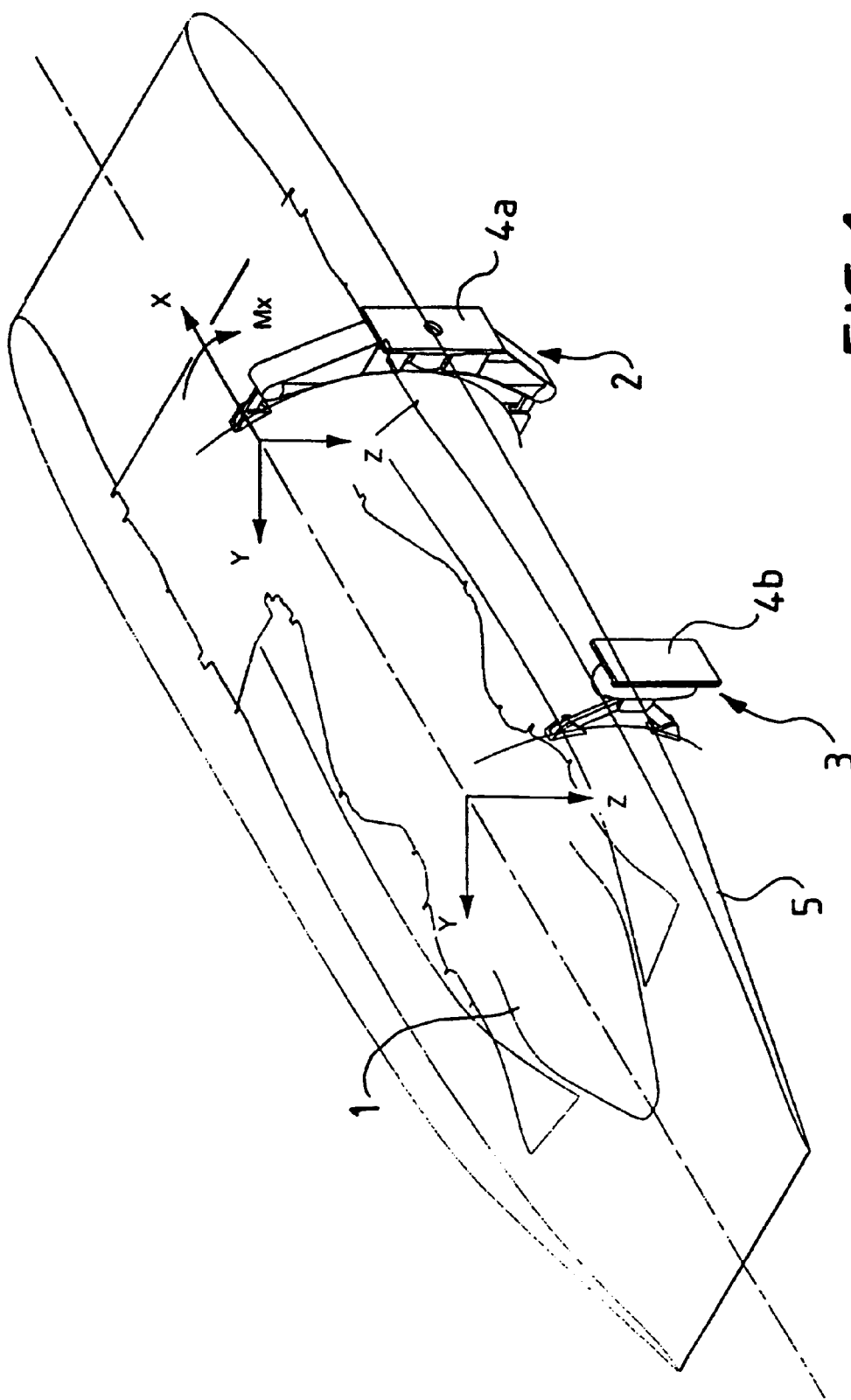
FIG. 1 is a view of the front and rear suspension systems of a powerplant attached laterally to an aircraft fuselage.
Figure 2:
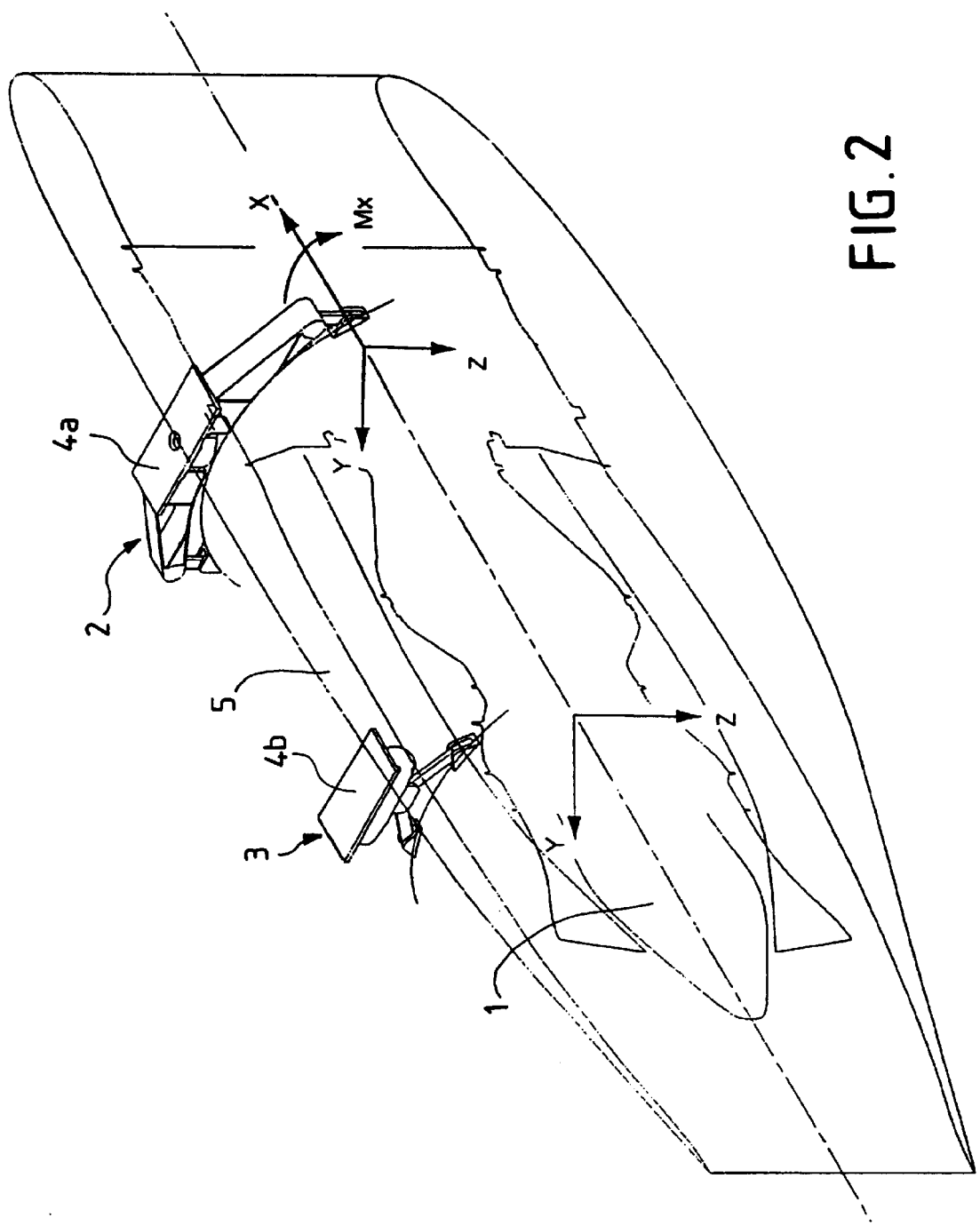
FIGS. 2 is a view of the front and rear suspension systems of a powerplant attached underneath an aircraft wing.
Figure 3:
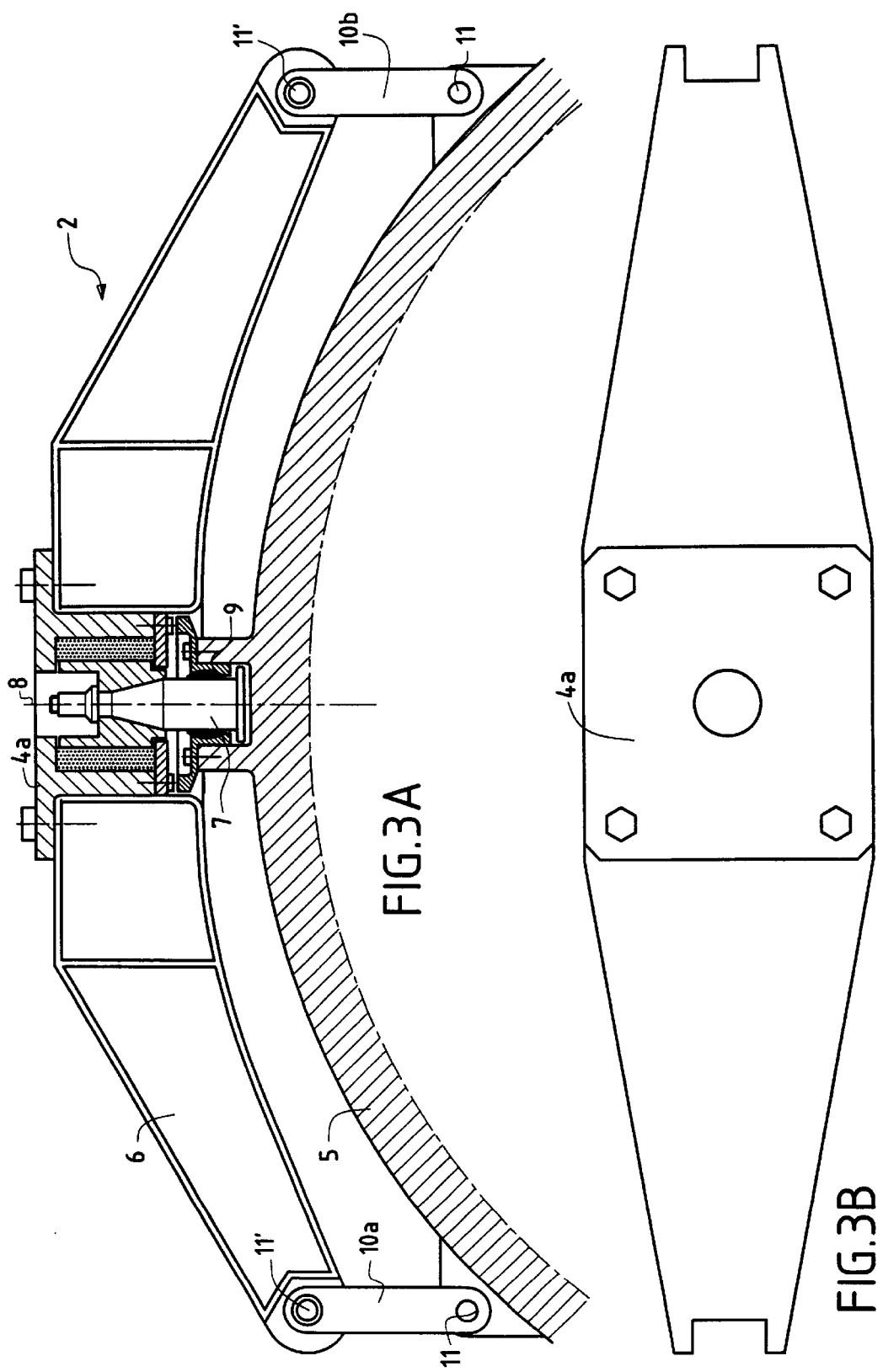

FIGS. 1 and 2 show a powerplant 1 having a longitudinal X-axis and fitted with a front suspension system 2 and a rear suspension system 3.

Each system is arranged with a front and rear bracket 4a and 4b, respectively, to affix the powerplant 1 to a truss of an aircraft frame, either to the fuselage (FIG. 1) or to the wing (FIG. 2). FIGS. 1 and 2 also show the vertical reference Z-axis and the transverse reference Y-axis. The three reference axes X, Y, Z are mutually orthogonal.

As shown in more detail in FIGS. 3 through 6, the front suspension 10 system 3 also comprises a suspension arm 6 and a spindle 7 which are rigidly joined to the bracket 4a. The Y-axis 8 of the spindle 7 is perpendicular to the longitudinal reference X-axis and coincides with the vertical Z-axis when the powerplant is suspended underneath a wing. The Y-axis 8 coincides with the transverse axis Y of the powerplant when the powerplant is attached to the fuselage.

The front suspension system 2 and the powerplant housing 5 are linked by a bearing 9 which may slide on the spindle 7 and by two lateral linkrods 10a and 10b. The linkrods 10a and 10b each link the housing 5 and one end of a suspension arm 6.

The bearing 9 is borne by a bearing cage 10 which is affixed to stubs 11a and 11b present on the housing 5. The bearing cage 10 comprises a male, cylindrical bearing cage surface 12 comprising a body of revolution about the Y-axis 8 of the spindle 7.

The bracket 4a extends toward the housing 5 by a cylindrical sleeve 13 comprising a body of revolution about the Y-axis 8 and being housed in a recess 14 belonging to the median part of the suspension arm 6.

The spindle 7 is mounted on a spindle support 15a encased with an elastomeric socket 16a insulating the aircraft against vibrations.

Figure 6:
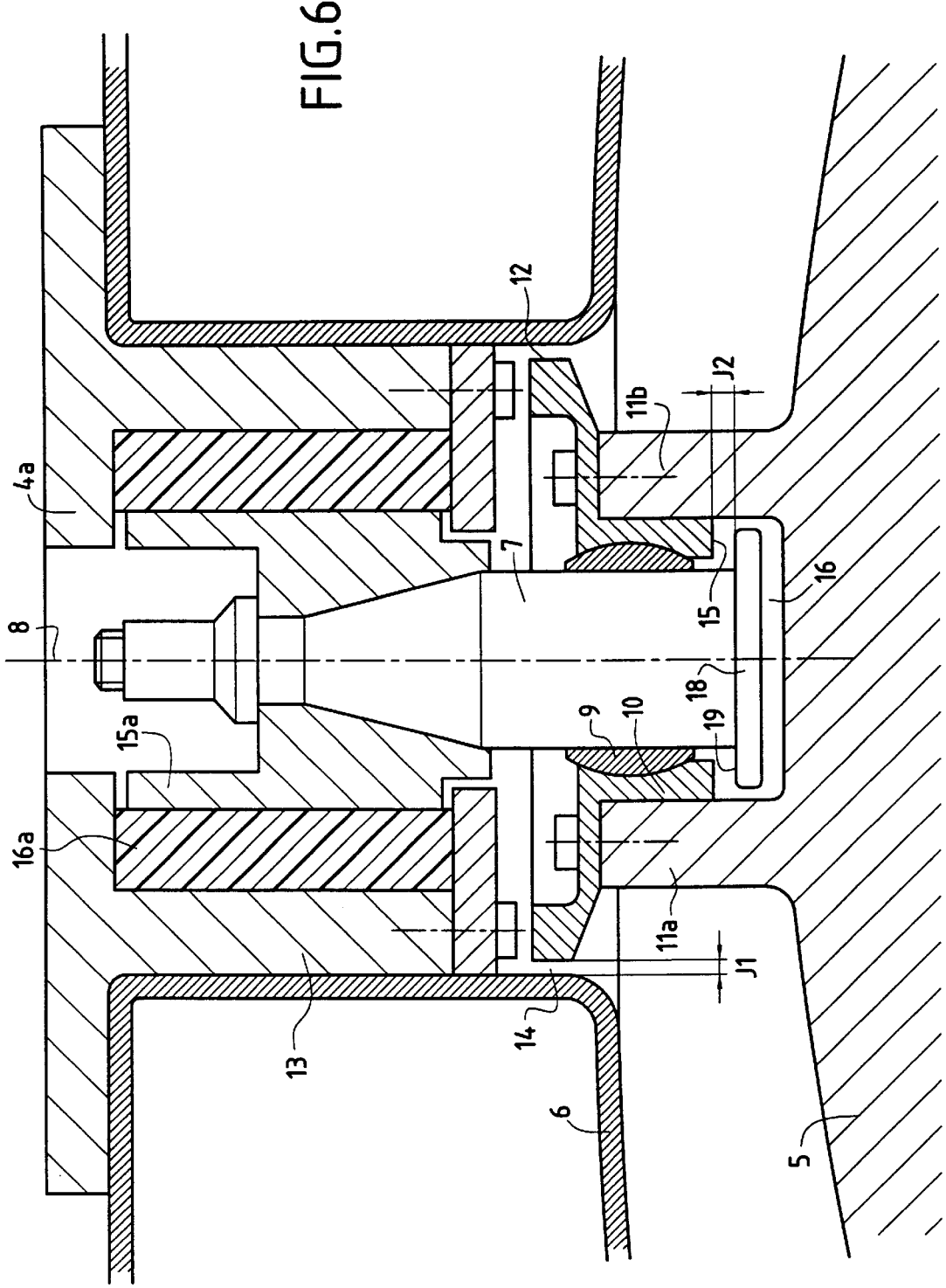

In a first embodiment mode, shown in detail in FIG. 6, the recess 14 runs toward the housing 5 over a distance greater than the length of the sleeve 13. The recess 14 has a radius which is slightly larger than the radius of the male cylindrical bearing cage surface 12. The inner part of the recess 14 encloses the male cylindrical bearing surface 12. The inner and outer parts of the components are defined in relation to the X-axis of rotation of the powerplant 1. A gap J1 is present between the wall of the recess 14 and the male, cylindrical bearing surface 12.

The stubs 11a and 11b of the housing 5 define a space with the housing 5 and the bearing cage 10 to receive a free end of the spindle 7. This end is arranged with an annular shoulder 18 running radially outward relative to the Y-axis 8 of the spindle 7. This annular shoulder 18 is located at a distance from the housing 5 and forms a distance of magnitude J2 away from the inside surface 15 of the bearing cage 10.

In normal operation, the bearing 9 freely slides along the spindle 7 to take into account the expansions of the housing 5 and the suspension arm 6. As a result, the magnitude J2 will be variable. This magnitude J2 is calculated in such a manner that in normal operation, the inside surface 15 of the bearing cage 10 does not rest on the outside surface 19 of the shoulder 18.

The gap J1 accounts for expected expansions of the bearing cage 10 in such a manner that, in normal operation, the bearing cage 10 is free to slide along the spindle 7.

Figure 4:
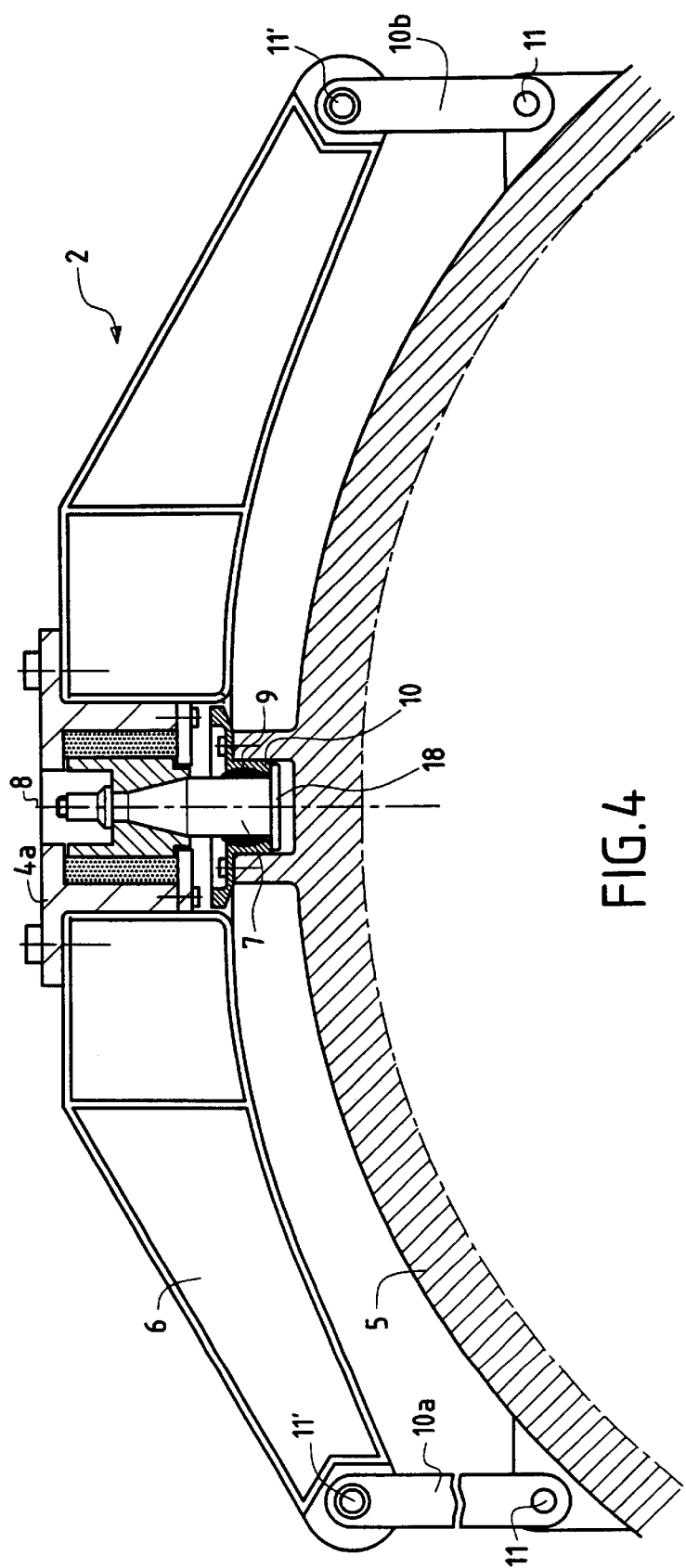
FIG. 4,is a cross-sectional view illustrating the suspension system of FIG. 3a in the event of a linkrod fracture.

FIG. 4 shows the configuration assumed by the housing 5 relative to the suspension arm 6 in the event the left linkrod 10a fractures. In this configuration, the housing 5 pivots about the right linkrod 10b and the bearing 9 slides along the spindle 7 by a maximum inward or outward value relative to the axis of rotation of the powerplant 1. When the bearing 9 slides inward, the shoulder 18 comes to rest against the housing 5.

If on the other hand the bearing slides outward, the outside surface 19 of the shoulder 18 comes into contact with the inside surface 15 of the bearing cage 10, thereby preventing the bearing 9 from leaving contact from the spindle 7 and limiting the travel of the bearing cage 10.

Figure 5:
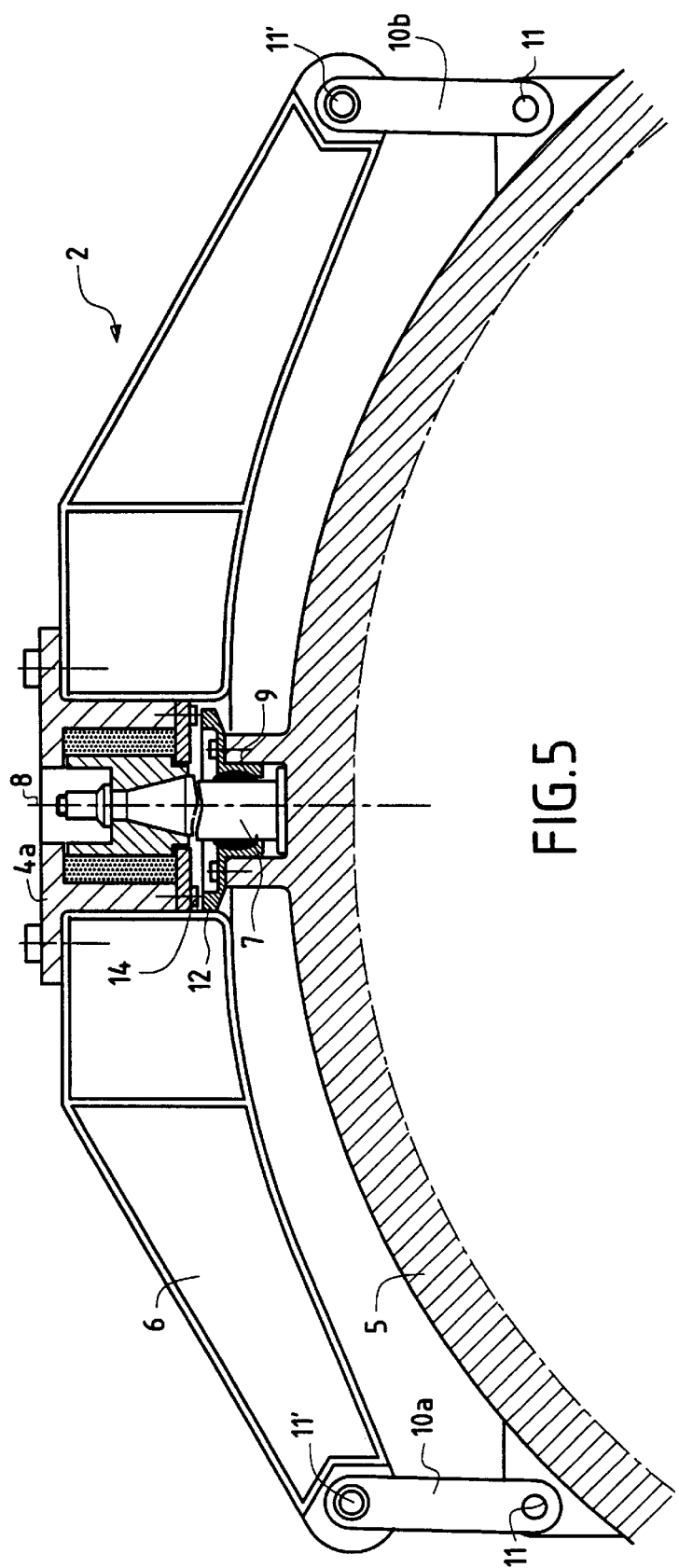
FIG. 5 is a cross-sectional view illustrating the suspension system of FIG. 3a in of spindle fracture.

In the event the spindle 7 breaks, as shown in FIG. 5, the male cylindrical bearing surface 12 comes to rest against the wall of the suspension arm 6 bounding the recess 14. In this manner the bearing cage 10 undergoes a lateral displacement limited to the distance J1.

Figure 7:
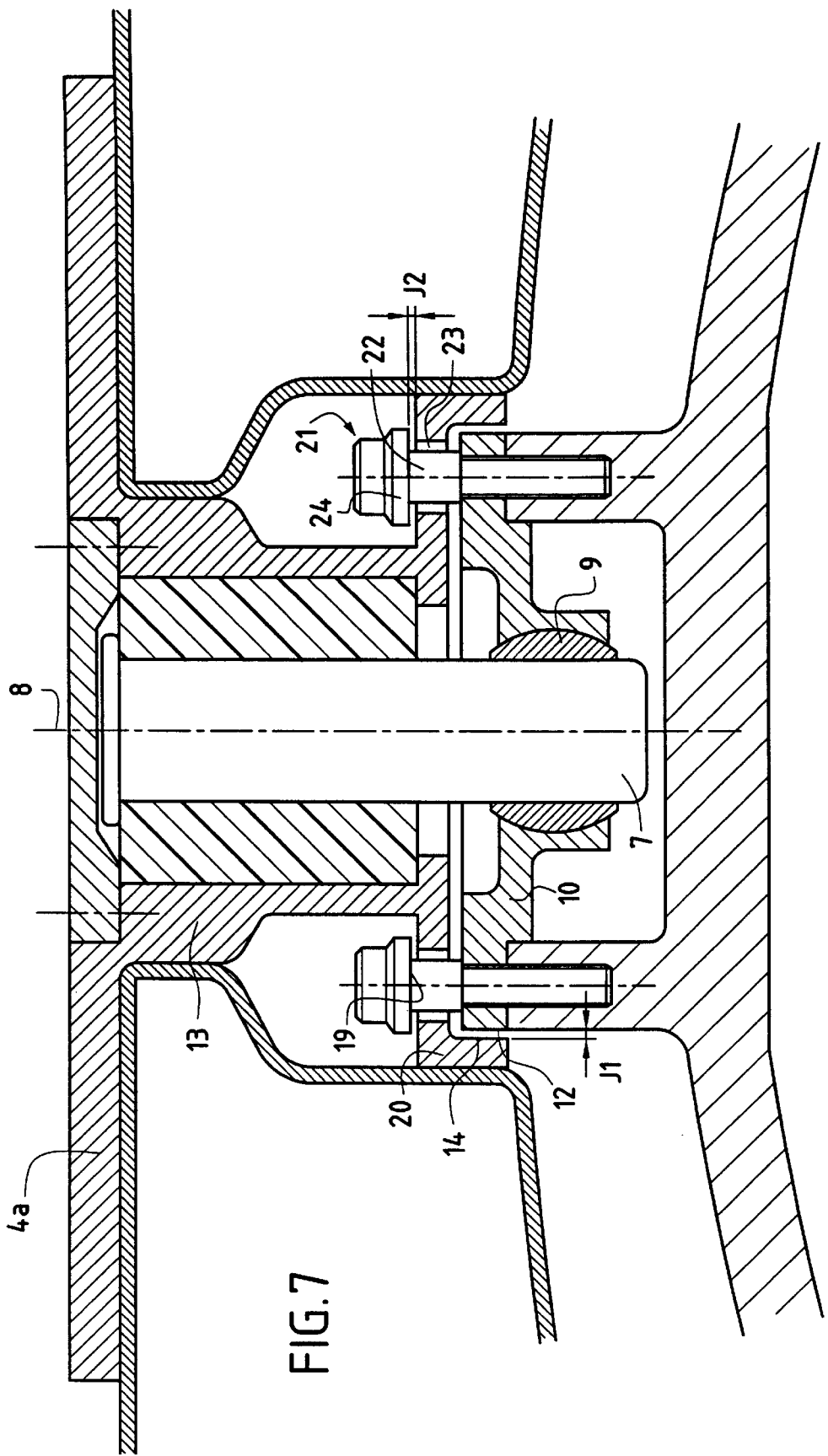
FIG. 7 is a partial, cross-sectional view showing a second embodiment of the present invention.

FIG. 7 shows an embodiment variation. In this variantion, the bracket 4a extends towards the housing 5 by a cylindrical sleeve 13. The cylindrical sleeve 13 has an inner end that terminates in a flange 20 and is provided with an outer, cylindrical bearing surface that rests against a recess in the median part of the suspension arm 6 and with an inner cylindrical bearing surface 14 that is situated a distance J1 from the male cylindrical bearing surface 12. The bearing cage 10 contains a bearing 9 arranged to slide on the spindle 7 inside the stub 13 of an elastomeric socket 16a insulating the aircraft against vibrations.

The bearing cage 10 is affixed on the stubs 11a and 11b of the housing 5 by a plurality of screws 21 of which the axes run parallel to the axis 8 of the spindle and which are fitted with shank segments 22 passing the distance J1 through matching orifices 23 in the flange 20. The shank segments 22 are configured above the outside surface of the bearing cage 10 and are topped by screw heads 24 of a diameter larger than the diameter of the orifices 23. During operation, the inside surfaces 19 of the screw heads are situated a distance J2 from the outside surface of the flange 20. The length of the shank segments 22 is larger than the thickness of the flange 20. In the event the spindle 7 fractures, the bearing cage 10 shifts by a distance J1 and the male cylindrical bearing surface rests against the recess 14. Moreover, the shank segments 22 rest against the rims of the orifices 23. In the event one of the linkrods 10a or 10b fractures, the screw heads 24 prevent the bearing 9 from leaving contact from the spindle 7 since the inside surfaces 19 come to rest against the outside surface of the flange 20.

What is claimed is:

1. A suspension system for an aircraft powerplant attached to an aircraft frame and having a housing, said suspension system comprising:

a spindle mounted in a spindle support rigidly joined to the aircraft frame, said spindle and said spindle support extending along a Y-axis perpendicular to a longitudinal X-axis of said powerplant;

a bearing cage affixed to the housing and extending along the Y-axis, said bearing cage including a bearing positioned therein and coaxial to said Y-axis;

a pair of suspension arms, each of said arms connected to a side of said spindle support opposite to said other arm; and a pair of lateral linkrods, each linkrod configured to link said housing and a respective one said suspension arms;

wherein side surfaces of said bearing cage and oppositely opposed side surfaces of said suspension arms generally along the Y-axis define a first clearance therebetween concentric to said Y-axis;

wherein said bearing cage is configurable along said spindle such that said bearing cage is limited to displacement along the Y-axis and maintains contact with said spindle.

2. A suspension system according to claim 1 wherein said spindle includes an annular shoulder extending radially outward relative to said Y-axis such that said spindle shoulder limits travel of said bearing cage.

3. A suspension system according to claim 2 wherein opposed surfaces generally along the X-axis of said bearing cage and said annular shoulder define a variable second clearance therebetween coaxial to the Y-axis.

4. A suspension system according to claim 1 wherein the bearing cage is connected to the housing by screws arranged parallel to said Y-axis and having top and bottom ends, said screws being fitted with shank segments passing through orifices defined along a flange of said spindle support and being received at said bottom ends by said bearing cage, said screws having screw heads mounted on the top ends thereof with a diameter larger than said orifices of said bearing cage, wherein opposed surfaces generally along the X-axis of said screw heads and said spindle support define a variable second clearance therebetween parallel to the Y-axis.

* * * * *

UNITED STATES PATENT AND TRADEMARK OFFICE
CERTIFICATE OF CORRECTION

PATENT NO. : 6,474,596 B1
DATED : November 5, 2002
INVENTOR(S) : Cousin et al.

It is certified that error appears in the above-identified patent and that said Letters Patent is hereby corrected as shown below:

Column 2,
Line 37, after "in" insert -- the event --.
Line 57, delete "10".

Signed and Sealed this

Eighteenth Day of February, 2003

JAMES E. ROGAN
*Director of the United States Patent and Trademark Office*